(12) United States Patent
Ikeda et al.

(10) Patent No.: US 8,941,386 B2
(45) Date of Patent: Jan. 27, 2015

(54) BUSBAR FOR BATTERY ELECTRODE POST CONNECTION AND BATTERY VOLTAGE MONITOR USING THE SAME

(75) Inventors: Tomohiro Ikeda, Makinohara (JP); Shinichi Yanagihara, Makinohara (JP); Hideki Inoue, Makinohara (JP)

(73) Assignee: Yazaki Corporation, Tokyo (JP)

( * ) Notice: Subject to any disclaimer, the term of this patent is extended or adjusted under 35 U.S.C. 154(b) by 396 days.

(21) Appl. No.: 13/503,538

(22) PCT Filed: Oct. 28, 2010

(86) PCT No.: PCT/JP2010/069225
§ 371 (c)(1),
(2), (4) Date: Apr. 23, 2012

(87) PCT Pub. No.: WO2011/052699
PCT Pub. Date: May 5, 2011

(65) Prior Publication Data
US 2012/0212232 A1 Aug. 23, 2012

(30) Foreign Application Priority Data
Oct. 28, 2009 (JP) ................................. 2009-247997

(51) Int. Cl.
*G01N 27/416* (2006.01)
*H01M 2/10* (2006.01)
(Continued)

(52) U.S. Cl.
CPC ............ *H01M 2/1077* (2013.01); *H01M 2/206* (2013.01); *H01M 10/482* (2013.01); *H01M 2/305* (2013.01)
USPC ............ 324/426; 324/429; 324/434; 324/433

(58) Field of Classification Search
USPC .......... 324/426, 429, 434, 433; 429/149, 160; 439/212, 721, 907
See application file for complete search history.

(56) References Cited

U.S. PATENT DOCUMENTS 2,206,122 A * 7/1940 Rasch ............................. 429/74
3,995,103 A * 11/1976 Gehrs et al. .................. 174/72 B
(Continued)

FOREIGN PATENT DOCUMENTS

| CN | 101483227 A | 7/2009 |
|---|---|---|
| CN | 1 01 521 341 A | 9/2009 |

(Continued)

OTHER PUBLICATIONS

Office Action dated Nov. 5, 2013, issued by the Japan Patent Office in corresponding Japanese Application No. 2011-538489.
(Continued)

*Primary Examiner* — Stacy Whitmore
(74) *Attorney, Agent, or Firm* — Sughrue Mion, PLLC

(57) ABSTRACT

A busbar for battery electrode post connection with a terminal for voltage detection is provided. Both ends of a length direction of a rectangular thin plate of a conductive metal are left and an elongated opening is formed in a center. Two holes through which an electrode post of one battery and an electrode post of an adjacent battery are inserted are respectively formed in the rectangular thin plates of both sides around the elongated opening of the center. A terminal for voltage detection is extended integrally to the rectangular thin plate from an edge of the rectangular thin plate. The two holes overlap in a state of where the rectangular thin plate is folded in two with respect to the elongated opening. The terminal for voltage detection can be erected from the rectangular thin plate by folding the terminal for voltage detection in a vertical direction.

5 Claims, 12 Drawing Sheets

(51) Int. Cl.
  *H01M 2/20* (2006.01)
  *H01M 10/48* (2006.01)
  *H01M 2/30* (2006.01)

(56) References Cited

U.S. PATENT DOCUMENTS

| | | | |
|---|---|---|---|
| 5,142,765 | A | 9/1992 | Tanaka |
| 6,290,552 | B1 | 9/2001 | Saito et al. |
| 7,648,538 | B2 * | 1/2010 | Oogami et al. ............... 29/623.4 |
| 7,875,378 | B2 * | 1/2011 | Yang et al. ...................... 429/61 |
| 8,038,487 | B2 * | 10/2011 | Tsuchiya et al. .............. 439/765 |
| 8,263,249 | B2 * | 9/2012 | Yoon ................................ 429/99 |
| 8,598,884 | B2 * | 12/2013 | Yano et al. .................... 324/427 |
| 2002/0163339 | A1 * | 11/2002 | Friel et al. .................... 324/434 |
| 2004/0043663 | A1 | 3/2004 | Ikeda et al. |
| 2006/0246350 | A1 * | 11/2006 | Takayama et al. ............ 429/178 |
| 2006/0250110 | A1 | 11/2006 | Yanagida et al. |
| 2007/0020513 | A1 * | 1/2007 | Medina et al. ................ 429/120 |
| 2007/0099074 | A1 * | 5/2007 | Yoon et al. .................... 429/158 |
| 2008/0124617 | A1 * | 5/2008 | Bjork .............................. 429/90 |
| 2009/0181288 | A1 | 7/2009 | Sato |
| 2009/0274956 | A1 | 11/2009 | Kosugi et al. |
| 2010/0015519 | A1 | 1/2010 | Trester et al. |
| 2010/0271036 | A1 * | 10/2010 | Kishimoto et al. ............ 324/434 |
| 2011/0104556 | A1 * | 5/2011 | Kim et al. ...................... 429/160 |
| 2011/0159353 | A1 * | 6/2011 | Byun et al. .................... 429/160 |
| 2011/0248719 | A1 * | 10/2011 | Aoki .............................. 324/426 |
| 2011/0262797 | A1 * | 10/2011 | Kim .............................. 429/149 |
| 2012/0040226 | A1 * | 2/2012 | Kim et al. ...................... 429/120 |
| 2013/0164601 | A1 * | 6/2013 | Kim et al. ...................... 429/160 |
| 2013/0280578 | A1 * | 10/2013 | Yang et al. .................... 429/121 |
| 2014/0062493 | A1 * | 3/2014 | Farrell .......................... 324/426 |
| 2014/0065468 | A1 * | 3/2014 | Nakayama, Osamu ....... 429/160 |

FOREIGN PATENT DOCUMENTS

| | | |
|---|---|---|
| JP | 4215283 A | 8/1992 |
| JP | 2000333343 A | 11/2000 |
| JP | 200495381 A | 3/2004 |
| JP | 2006253084 A | 9/2006 |
| JP | 2008288077 A | 11/2008 |
| JP | 200959663 A | 3/2009 |
| WO | 2008/098193 A2 | 8/2008 |
| WO | 2009/041735 A1 | 4/2009 |

OTHER PUBLICATIONS

Written Opinion (PCT/ISA/237) issued on Jan. 25, 2011 in the International Patent Application No. PCT/JP2010/069225.
International Search Report (PCT/ISA/210) issued on Jan. 25, 2011 in the International Patent Application No. PCT/JP2010/069225.
Office Action issued Jul. 30, 2013, by the Japanese Patent Office in corresponding application No. 2011-538489.
Communication, dated Jan. 23, 2014, issued by the State Intellectual Property Office of P.R. China in counterpart Chinese Patent Application No. 201080048799.1.

* cited by examiner

SOLDERING REGION

BATTERY VOLTAGE MONITOR

BUSBAR FOR BATTERY ELECTRODE POST CONNECTION AND BATTERY VOLTAGE MONITOR USING THE SAME

TECHNICAL FIELD

The present invention is related to an apparatus for monitoring terminal voltages of multiple batteries constructing a DC power source of an electric vehicle or a hybrid car, and particularly to a busbar for battery electrode post connection capable of easily doing work of connection between multiple battery terminals and voltage detecting terminals and work of assembly of the voltage detecting terminals and a printed circuit, and a battery voltage monitor using this busbar.

BACKGROUND ART

In recent years, electric vehicles or hybrid cars have accommodated attention as eco-friendly motor vehicles instead of vehicles using a gasoline engine or a diesel engine. However, the electric vehicles or hybrid cars require a power source with high voltage and high output, so that multiple batteries are connected in series.

Therefore, a battery voltage monitor for always monitoring whether a terminal voltage of each of the batteries is maintained at a predetermined value is required in order to obtain the high voltage from the batteries. However, work of connection between multiple battery terminals and voltage detecting terminals and work of assembly of the voltage detecting terminals and a printed circuit have been troublesome until now.

<Voltage Detection Principle of Battery Voltage Monitor Handled by the Invention>

First, a voltage detection principle of a battery voltage monitor handled by the invention will be described.

<<Arrangement of Plural Batteries>>

FIG. 5 is a connection circuit diagram of batteries which the battery voltage monitor according to the invention targets for monitoring. In FIG. 5, each of the batteries B1 to Bn is one battery constructing the minimum unit, and includes a positive electrode post 10P and a negative electrode post 10N. Both of the positive electrode post 10P and the negative electrode post 10N have the same shape and are formed in a columnar shape and are bolts whose surfaces are grooved. The battery B2 adjacent to the battery B1 similarly includes a positive electrode post 10P and a negative electrode post 10N, but the arrangement is set in an opposite direction and the negative electrode post 10N of the battery B2 is placed next to the positive electrode post 10P of the battery B1 and the positive electrode post 10P of the battery B2 is placed next to the negative electrode post 10N of the battery B1. Further, the battery B3 adjacent to the battery B2 similarly includes a positive electrode post 10P and a negative electrode post 10N, but the arrangement is set in a direction opposite to the battery B2 and the negative electrode post 10N of the battery B2 is placed next to the positive electrode post 10P of the battery B3 and the positive electrode post 10P of the battery B2 is placed next to the negative electrode post 10N of the battery B3. Afterward, based on this rule, the batteries are arranged in like manner and an A-line battery of a battery pack made of the batteries B1 to Bn is completed.

In like manner, a B-line battery is also formed.

<<Series Connection of Batteries B1 to Bn>>

In FIG. 5, the positive electrode post 10P of the battery B1 is connected to the negative electrode post 10N of the adjacent battery B2 by a busbar 10. The busbar 10 is made by punching a conductive metal plate in a rectangular shape and insertion holes for inserting the electrode posts are opened in two places. The positive electrode post 10P of the battery B1 is electrically connected to the negative electrode post 10N of the battery B2 by respectively inserting the positive electrode post 10P of the battery B1 and the negative electrode post 10N of the adjacent battery B2 into the two insertion holes of this busbar 10 and respectively tightening the electrode posts with nuts. Afterward, this is sequentially repeated and a positive electrode post 10P of the last battery Bn of the A-line battery is connected to a negative electrode post 10N of the last battery Bn of the B-line battery through a long busbar 10AB and afterward, connections between an electrode post of the battery and an electrode post of the adjacent battery through a busbar 10 are repeated inside the B-line battery in like manner and finally, a series connection circuit of all the batteries of the A-line battery and the B-line battery is completed, and a DC high-voltage power source using a terminal 10T1 as a negative electrode and a terminal 10T2 as a positive electrode is formed.

<<Formation of Battery Voltage Monitoring Circuit>>

In order to monitor whether terminal voltages of all the batteries of the A-line battery and the B-line battery of FIG. 5 are maintained at a predetermined voltage, a battery voltage monitor 60 as shown in FIG. 6 is added to a DC high-voltage circuit of FIG. 5. FIG. 6 is a circuit diagram of a battery circuit apparatus made by electrically connecting terminals 50 for voltage detection to the busbars 10. As the electrical connection, welding, solder, elastic pressure welding (see Patent Literature 1 as the elastic pressure welding), etc. are used. A detection line 40W is laid from each of the terminals 50 for voltage detection electrically connected in this manner to each of the terminals of the battery voltage monitor 60. In the case of assuming that the terminals of the battery voltage monitor 60 connected to terminals of the busbars 10 of the lower side of the A-line battery in FIG. 6 are set at T1, T3, T5, . . . , Tn-1 sequentially from the batteries near to the battery voltage monitor 60 and the terminals of the battery voltage monitor 60 connected to terminals of the busbars 10" of the upper side of the A-line battery in FIG. 6 are similarly set at T0, T2, T4, . . . , Tn sequentially from the batteries near to the battery voltage monitor 60, a closed circuit is formed by sandwiching a DC voltmeter between both the electrode posts of the battery B2 when a negative terminal Pn of the DC voltmeter is connected to the terminal T0 and a positive terminal Pp is connected to the terminal T1 in order to measure a terminal voltage of the battery B1, so that a DC voltage between both the electrode posts of the battery B2 is obtained by reading a scale of the DC voltmeter.

Similarly, in order to measure a terminal voltage of the battery B2, the negative terminal Pn of the DC voltmeter could be connected to the terminal T2 and the positive terminal Pp could be still connected to the terminal T1.

Similarly, in order to measure a terminal voltage of the battery Bn, the negative terminal Pn of the DC voltmeter could be connected to the terminal Tn and the positive terminal Pp could be connected to the terminal Tn-1.

The above is a method for measuring the terminal voltages of the A-line battery.

Wiring of the battery voltage monitor 60 is not illustrated in the B-line battery side, but terminal voltages of the B-line battery side could be measured in a manner similar to the above.

<Improvement to Voltage Monitor (FIG. 6) in Patent Literature 1>

FIG. 7 is a front view describing a state of connection between a terminal 50 for voltage detection and both electrode posts (a positive electrode post 10P and a negative electrode post 10N) of a battery of a voltage monitor described in Patent Literature 1. In FIG. 7, in the voltage monitor described in Patent Literature 1, the terminals 50 for voltage detection erected and connected, in welding regions F1, to busbars 10 between batteries for connecting plural batteries B1 to B6 constructing an A-line battery of an electric vehicle in series are inserted into through holes 40L provided in a printed board 40 and are connected to a wiring pattern provided on this printed board 40 by soldering. The terminal 50 for voltage detection is formed using a thin metal plate in order to give a flexible structure capable of cushioning an external force in the case of applying the external force so that a crack etc. do not occur in a solder portion which is a place of connection between the printed board 40 and the terminal 50 for voltage detection.

However, the terminal 50 for voltage detection had a problem that it is difficult to position the terminal 50 for voltage detection in the case of inserting the terminal 50 for voltage detection into the through hole 40L since the terminal 50 for voltage detection has low rigidity due to flexible design and flexes under the own weight of the terminal 50 for voltage detection.

Also, all the batteries are provided with the terminals 50 for voltage detection one by one, but as described above, it was difficult to position the terminals 50 for voltage detection with the through holes 40L, so that it was extremely difficult to collectively insert the plural terminals 50 for voltage detection into the respective through holes 40L. As a result, work of attaching the terminals 50 for voltage detection to the printed board 40 had a problem that each of the terminals 50 for voltage detection must be inserted into each of the through holes 40L one by one and long labor time is required.

Also, since the terminal 50 for voltage detection is separate from the busbar 10, a work process of welding, solder, elastic pressure welding, etc. for connecting both of the terminal 50 and the busbar 10 was required, so that productivity was low.

Hence, the present applicant focuses attention on the problems described above, and previously invented a busbar for battery electrode post connection with high productivity capable of easily attaching the terminals for voltage detection to the printed board, and applied for a patent (Patent Literature 2).

CITATION LIST

Patent Literature

Patent Literature 1: JP-A-4-215283
Patent Literature 2: JP-A-2008-288077
<Voltage Monitor in Patent Literature 2>
<Shape of Busbar 10' of Patent Literature 2>

FIG. 8 is a perspective view of a terminal for voltage detection used in a voltage monitor based on the same idea as the invention described in Patent Literature 2.

In FIG. 8, numeral 10' is a busbar described in Patent Literature 2 and is made by continuously punching one long-roll conductive metal plate by press, and the invention described in Patent Literature 2 is characterized in that a terminal 13' for voltage detection is simultaneously punched with the terminal connected to the busbar 10' in the case of the punching.

Since the conventional terminal 50 for voltage detection (FIGS. 6 and 7) was separate from the busbar 10, the process of welding, solder, elastic pressure welding, etc. for connecting both of the terminal 50 and the busbar 10 was required, but herein, a terminal 13 (FIG. 13) for voltage detection punched integrally to the busbar 10' by press is only vertically erected from the busbar 10' and thereby the terminal 13 for voltage detection is formed, so that the connection process of welding, solder, elastic pressure welding, etc. can be omitted and productivity improves.

The busbar 10' of Patent Literature 2 is a plate for connecting a bolt constructing a positive electrode post provided in batteries B1 to Bn (FIG. 9A) to a bolt constructing a negative electrode post provided in the adjacent battery B, and two holes 10L, 10L are bored in the vicinity of the center of a rectangular thin conductive metal plate such as a copper plate. Therefore, a distance between the two holes 10L, 10L becomes equal to a distance between the positive electrode post and the negative electrode post (and vice versa) of the mutually adjacent rectangular batteries B.

After the bolt is inserted into each of the holes 10L, 10L of the busbar 10', the bolt is tightened with a nut N.

Also, the plural busbars 10' are respectively joined through joints 10R.

A mutual arrangement relation between a resin frame 30 and a resin case 20 for accommodating the busbar 10' will be described using FIGS. 9A to 10 before describing how to use the busbar 10' described in Patent Literature 2.

<Mutual Arrangement Relation Between Resin Case 20 and Resin Frame 30>

FIG. 9A is the whole view of a battery voltage monitor and batteries used in the busbars 10' described in Patent Literature 2 and is an exploded perspective view and is the battery voltage monitor and a battery aggregate, and FIG. 9B is the whole perspective view of combination of the battery voltage monitor and the battery aggregate of FIG. 9A.

In FIG. 9A, numeral 100 is a battery circuit apparatus including a battery voltage monitoring circuit and a series connection circuit for connecting plural batteries in series, and numeral 200 is the battery aggregate made of the plural batteries.

The battery circuit apparatus 100 of FIG. 9A is made by combining a busbar, a resin case body made by continuously forming multiple resin cases for accommodating the busbars, a resin frame for accommodating terminals for voltage detection, and a printed board, but is difficult to be seen in a combined state, so that explanation is offered using FIG. 10 which is an exploded perspective view of the battery circuit apparatus of FIG. 9A.

In FIG. 10, the battery circuit apparatus 100 includes the busbars 10, the resin case body made by continuously forming the multiple resin cases 20 for accommodating the busbars 10, the resin frame 30 for accommodating the terminals for voltage detection, and the printed board 40.

The busbars 10 are shown in a state of continuously connecting the busbars with two holes. A synthetic resin-made board part 20H made by continuously forming the multiple resin cases 20 for respectively accommodating each of the busbars 10 is present under the continuously connected busbars 10.

By shearing the joints 1OR (FIG. 8) for mutually connecting each of the busbars 10 with a shearing machine, the one busbar 10 sheared drops and is accommodated inside the resin case 20 just under the busbar 10.

The synthetic resin-made board part 20H (FIG. 10) includes the resin cases 20 of four lines for two lines for an A-line battery 200A (FIG. 9A) and two lines for a B-line battery 200B (FIG. 9A).

Grooves in which the terminals 13 (FIG. 8) for voltage detection are accommodated in an erect state without change are formed in the resin frame 30 (FIG. 10).

Multiple wirings 40W for connecting the terminals 13 (FIG. 13) for voltage detection to a battery voltage monitor 60 (FIG. 13) are printed on the printed board 40 (FIG. 10).

The battery circuit apparatus 100 (FIG. 9A) obtained thus is placed on the battery aggregate 200 (FIG. 9A) and both electrode posts (a positive electrode post 10P and a negative electrode post 10N) present in each of the batteries of the battery aggregate 200 are penetrated through the holes 10L (FIG. 8) of each of the busbars 10' (FIG. 8) accommodated in the resin case 20 (FIG. 10) of the battery circuit apparatus 100 and are tightened with nuts and thereby, a main circuit is formed, and a main circuit and battery voltage monitor 300 shown in FIG. 9B is obtained. <Assembly Procedure of Busbars 10'>

Next, assembly procedures (1) to (3) of the busbars 10' will be described.

(1) <<Accommodating of Terminal 13' for Voltage Detection Integral with Busbar 10' in Resin Case 20.

FIG. 11A is a partially enlarged perspective view of the periphery of the resin case 20 in the synthetic resin-made board part 20H of FIG. 10. Each of the busbars 10' sheared from a chained state is accommodated in each of the resin cases 20 in a state of FIG. 8. Therefore, the terminal 13' for voltage detection integral with the busbar 10' is also accommodated inside a groove 30M of the resin frame 30 in an erect state. The top 13S of the terminal 13' for voltage detection projects highly from the resin frame 30 in a state of accommodating the terminal 13' for voltage detection inside the groove 30M of the resin frame 30. The projection height becomes higher than a thickness of the printed board 40 (FIG. 10) placed on the terminals 13', and the top 13S of the terminal 13' for voltage detection is projected from a through hole of the printed board 40 in a state of placing the printed board 40 and can be soldered to a conductor of the printed board 40.

(2) <<Press-In of Resin Frame 30>>

FIG. 11B is a perspective view separately depicting the resin frame 30 and the terminal 13' for voltage detection of the inside of a frame surrounded by a quadrilateral of FIG. 11A. The resin frame 30 descends from an upper portion of the terminal 13' for voltage detection, and the vicinity of the top of the terminal 13' for voltage detection is pressed into the groove 30M of the resin frame 30.

A locking protrusion 13K inclined so as to increase the thickness upward by an embossed protrusion is formed on a lateral surface of the terminal 13' for voltage detection, and the terminal 13' for voltage detection accommodated inside the groove 30M of the resin frame 30 is prevented from coming out.

(3) <<Soldering to printed board 40>>

Thereafter, the printed board 40 (FIG. 10) is placed on the terminals 13' for voltage detection and in that case, the top 13S of each of the terminals 13' for voltage detection is inserted into each of the through holes 40L provided in the printed board 40 (basically the same as FIG. 7) and is connected to a wiring pattern provided on this printed board 40 by soldering as shown in FIG. 12 and assembly is completed.

FIG. 13 is a circuit diagram of a battery circuit apparatus made by using terminals 13 for voltage detection formed integrally to the busbars 10' at the time of punching each of the busbars 10'. The circuit diagram differs from the circuit diagram of the battery circuit apparatus of FIG. 6 in that each of the busbars 10 and the terminals 13 for voltage detection are integrally punched in FIG. 13 while the terminal 50 for voltage detection is attached to each of the busbars 10 by welding, solder, elastic pressure welding, etc. in FIG. 6. The other circuit connection relation is the same.

<Merit of Terminal 13' for Voltage Detection in Patent Literature 2>

Since the conventional terminal 50 for voltage detection was separate from the busbar 10, the process of welding, solder, elastic pressure welding, etc. for connecting both of the terminal 50 and the busbar 10 was required, but as described above, the terminal 13' for voltage detection described in Patent Literature 2 is punched integrally to the busbar 10' by press herein, so that the terminal 13' for voltage detection is formed by only vertically erecting the terminal 13' (FIG. 8) for voltage detection from the busbar 10', with the result that the connection process of welding, solder, elastic pressure welding, etc. can be omitted.

SUMMARY OF INVENTION

Technical Problem

<Problems of Terminal 13' for Voltage Detection in Patent Literature 2>

FIG. 4B is a diagram describing a problem of the busbar 10' integral with the terminal 13' for voltage detection described in Patent Literature 2, and is a longitudinal sectional view longitudinally taken on a surface including two adjacent electrode posts of batteries.

When two electrode posts vary in height in the case of inserting a positive electrode post 10P of the battery B1 and a negative electrode post 10N of the adjacent battery B2 into each of the holes 10L, 10L of the busbar 10' and respectively tightening the electrode posts with nuts N, the busbar 10' has rigidity, so that the busbar 10' is inclined and attached and poor contact among both the electrode posts (the positive electrode post 10P and the negative electrode post 10N), the busbar 10' and the nuts N occurs and a load is applied to the batteries.

<Object of Invention>

The invention has been implemented to solve these problems, and an object of the invention is to provide a busbar for preventing a load from being applied to a battery by good contact among both electrode posts (a positive electrode post and a negative electrode post), the busbar and a nut without inclining a contact portion of the busbar even if the two electrode posts vary in height.

Solution to Problem

In order to solve the problems described above, a first invention of the present application relates to a busbar for battery electrode post connection with a terminal for voltage detection, wherein:

both ends of a length direction of a rectangular thin plate of a conductive metal are left and an elongated opening is formed in a center;

two holes through which an electrode post of one battery and an electrode post of an adjacent battery are inserted are respectively formed in the rectangular thin plates of both sides around the elongated opening of the center;

a terminal for voltage detection is extended integrally to the rectangular thin plate from an edge of the rectangular thin plate;

the two holes overlap in a state of where the rectangular thin plate is folded in two with respect to the elongated opening; and the terminal for voltage detection can be erected from the rectangular thin plate by folding the terminal for voltage detection in a vertical direction.

Also, in the busbar for battery electrode post connection with the terminal for voltage detection of the first invention, a second invention is characterized in that a locking protrusion by an embossed protrusion is formed on a lateral surface of the terminal for voltage detection.

Also, in the busbar for battery electrode post connection with the terminal for voltage detection of the first invention, a third invention is characterized in that a height of a top of the terminal for voltage detection is a height in which the terminal for voltage detection can project over a printed board in a state of being inserted into a through hole of the printed board.

Also, a fourth invention relates to a DC high-voltage power source circuit and battery voltage monitor, wherein:

a DC high-voltage power source circuit is made by juxtaposing plural batteries with electrode posts of mutually different polarities arranged adjacently and connecting the electrode posts of the different polarities of the adjacent batteries by a busbar;

a battery voltage monitoring circuit is formed so as to detect a voltage between the busbar and an adjacent busbar through a printed board; and a busbar for battery electrode post connection with a terminal for voltage detection set forth in any one of the first invention to the third invention is used in connection between the busbar and the printed board.

Advantageous Effects of Invention

According to the first invention as described above, since the conventional terminal for voltage detection was separate from the busbar, a process of welding, solder, pressure welding, etc. for connecting both of the terminal and the busbar was required, but this process can be omitted and the busbar is formed by being folded in two around the elongated opening of the center, so that the busbar tends to flex and even when the electrode posts of the battery and the adjacent battery vary in height, contact between the battery electrode posts and the busbar can surely be made, with the result that a load is not applied to the battery.

According to the second invention, the locking protrusion by the embossed protrusion is formed on the lateral surface of the terminal for voltage detection, so that the terminal for voltage detection can completely be pressed in and does not come out.

According to the third invention, the height of the top of the terminal for voltage detection is the height in which the terminal for voltage detection can project over the printed board in the state of being inserted into the through hole of the printed board, so that the terminal for voltage detection can smoothly be soldered to the printed board.

According to the fourth invention, in the battery voltage monitoring circuit for detecting the voltage between the busbar of the DC high-voltage power source circuit and battery voltage monitoring circuit and the adjacent busbar through the printed board, the busbar for battery electrode post connection with the terminal for voltage detection of the first to third inventions is used in connection between the busbar and the printed board, so that the merits had by the first to third inventions can also be obtained herein.

BRIEF DESCRIPTION OF DRAWINGS

FIG. 1A shows a developed state and FIG. 1B shows a folded state. Also.

FIG. 2A is a partially enlarged perspective view and FIG. 2B is a perspective view depicting the middle of press-in of a resin frame and the terminal for voltage detection of the inside of a frame surrounded by a quadrilateral of FIG. 2A.

FIG. 9A is an exploded perspective view and is the battery voltage monitor and a battery aggregate, and FIG. 9B is the whole view of combination of the battery voltage monitor and the battery aggregate.

FIG. 11A is a partially enlarged perspective view and FIG. 11B is a perspective view depicting the middle of press-in of a resin frame and a terminal for voltage detection of the inside of a frame surrounded by a quadrilateral of FIG. 11A.

DESCRIPTION OF EMBODIMENTS

A busbar of the invention capable of preventing a load from being applied to a battery by good contact among electrode posts, the busbar and a nut without inclining a contact portion of the busbar even if the electrode posts vary in height as well as capable of omitting a welding process of connecting a terminal for voltage detection to the busbar will hereinafter be described based on FIGS. 1 to 4.

<Shape of Busbar 10 of the Invention>

Figure 1A:
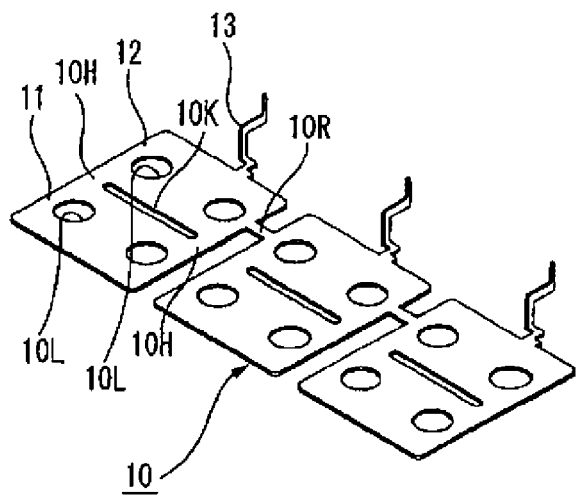
FIGS. 1A and 1B are perspective views of a terminal for voltage detection according to the invention.
Figure 1B:
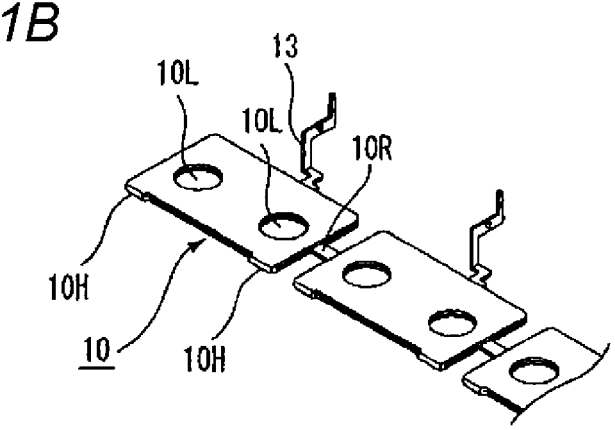

FIGS. 1A and 1B are perspective views of a terminal for voltage detection according to the invention. FIG. 1A shows a developed state and FIG. 1B shows a folded state. Also, FIG. 1C is a side view showing the folded state by 180 degrees.

Figure 8:
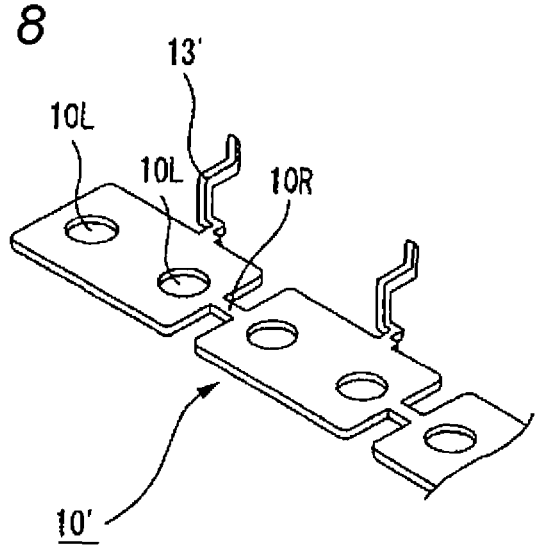
FIG. 8 is a perspective view of a terminal for voltage detection used in a voltage monitor based on the invention described in Patent Literature 2.
Figure 9A:
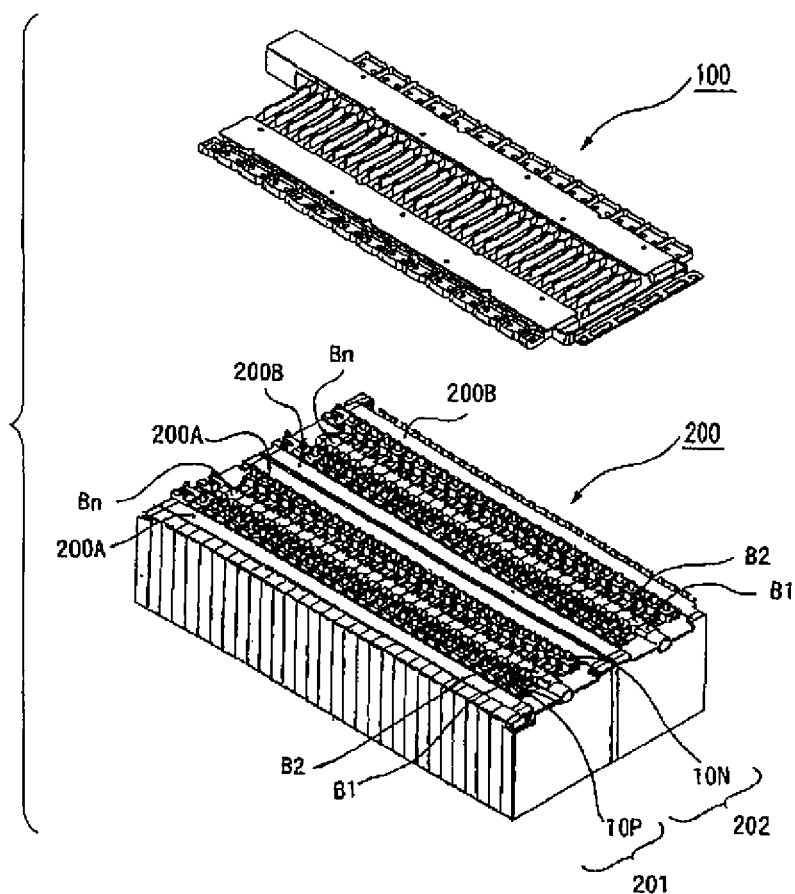
FIGS. 9A and 9B are the whole views of a battery voltage monitor and batteries used in the busbars described in Patent Literature 2.
Figure 9B:
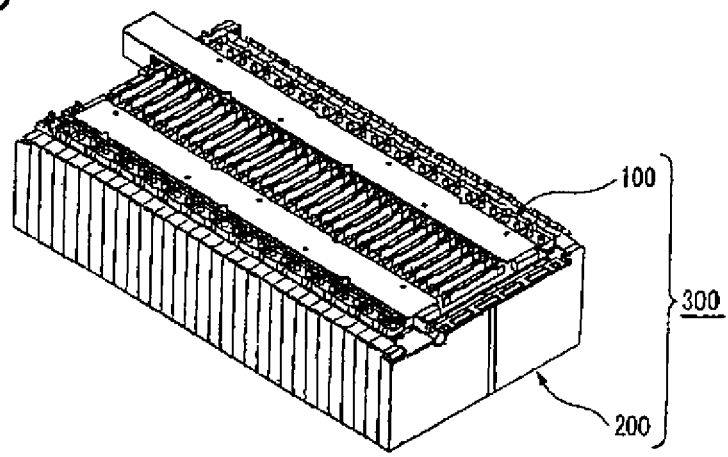

In FIGS. 1A and 1B, a busbar 10 according to the invention is basically a rectangular thin plate of a conductive metal having an area two times the busbar 10' (FIG. 8) of Patent Literature 2 and a thickness one-half the busbar 10', and hinge parts 10H, 10H of both ends of a length direction of the rectangular thin plate are left and an elongated opening 10K is formed in the center and thereby, a hinge function of bending is provided to the hinge parts 10H, 10H and holes 10L, 10L are respectively formed in one busbar 11 and the other busbar 12 around the hinge parts 10H, 10H and further, a terminal 13 for voltage detection is made in the center of the edge of the other busbar 12 by being punched integrally to the busbar 10 at the time of punching the busbar 10. When the terminal 13 for voltage detection is vertically erected after the punching, the terminal 13 for voltage detection is erected from the other busbar 12 as shown in FIG. 1A.

Therefore, when one busbar 11 is folded around the hinge parts 10H, 10H and is stacked on the other busbar 12, the busbar having the same function as that of the busbar 10' of Patent Literature 2 is completed as shown in FIG. 1B and also is constructed of the two thin metal plates, so that an effect of absorbing variations in height by bending of 180 degrees and stress relaxation of a battery and the busbar can be obtained.

Figure 1C:
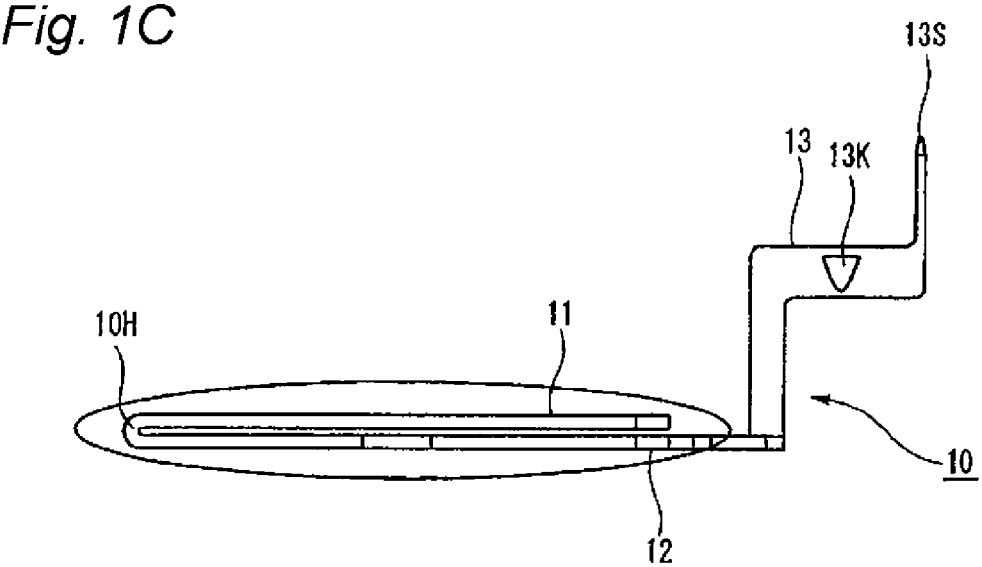
FIG. 1C is a side view showing the folded state by 180 degrees.

In FIG. 1C, in the busbar 10 according to the invention, one busbar 11 is stacked on the other busbar 12 around the hinge parts 10H, 10H and the terminal 13 for voltage detection is erected from the edge and a locking protrusion 13K by an embossed protrusion is formed on a lateral surface of the terminal 13 for voltage detection. Also, the top 13S of the terminal 13 for voltage detection extends long upward and extends through a through hole 40L of a printed board 40 (FIG. 3) and has a length projecting from the printed board 40.

<Assembly Procedure of Busbars 10>

Assembly procedures (1) to (3) of the busbars 10 are basically the same as the assembly procedures (1) to (3) of the busbars 10' which are the prior invention (Patent Literature 2).

(1) <<Accommodating of Terminal 13 for Voltage Detection Integral with Busbar 10 in Resin Case 20>>

Figure 2B:
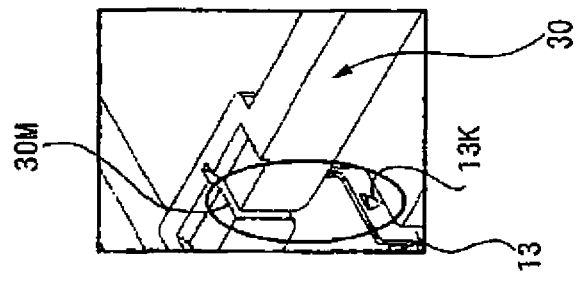
FIGS. 2A and 2B are diagrams describing the periphery of a resin case of the invention in a synthetic resin-made board part.
Figure 2A:
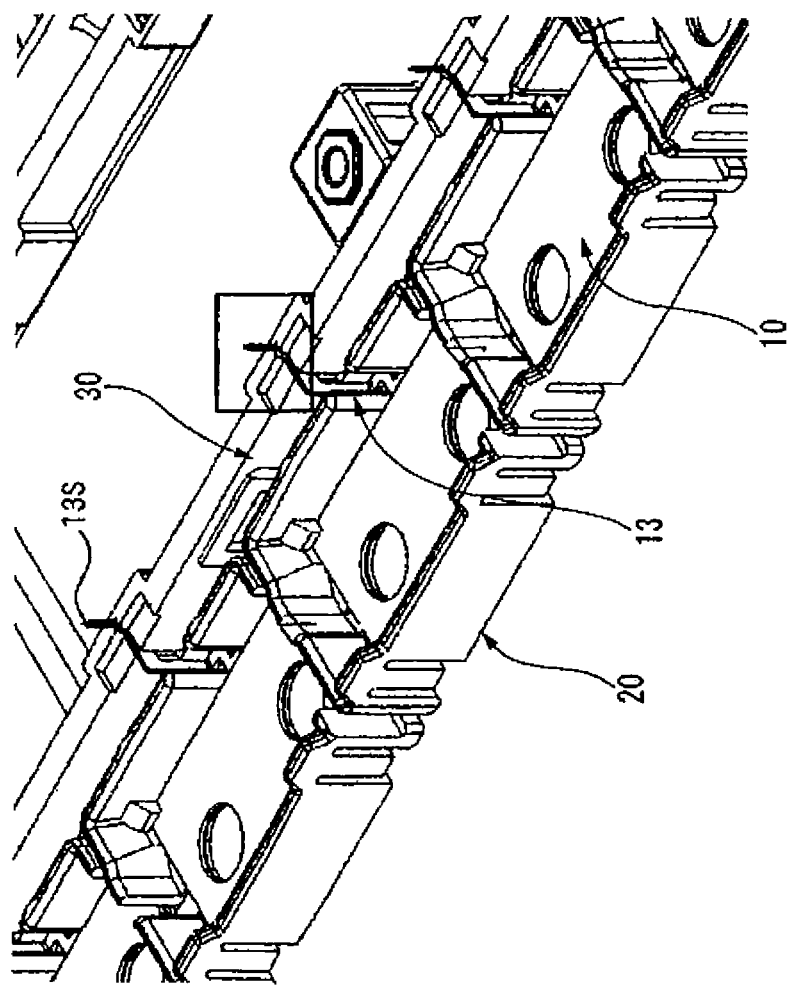

FIGS. 2A and 2B are diagrams describing the periphery of a resin case of the invention in a synthetic resin-made board part. FIG. 2A is a partially enlarged perspective view and FIG. 2B is a perspective view depicting the middle of press-in of a resin frame and a terminal for voltage detection of the inside of a frame surrounded by a quadrilateral of FIG. 2A.

Figure 10:
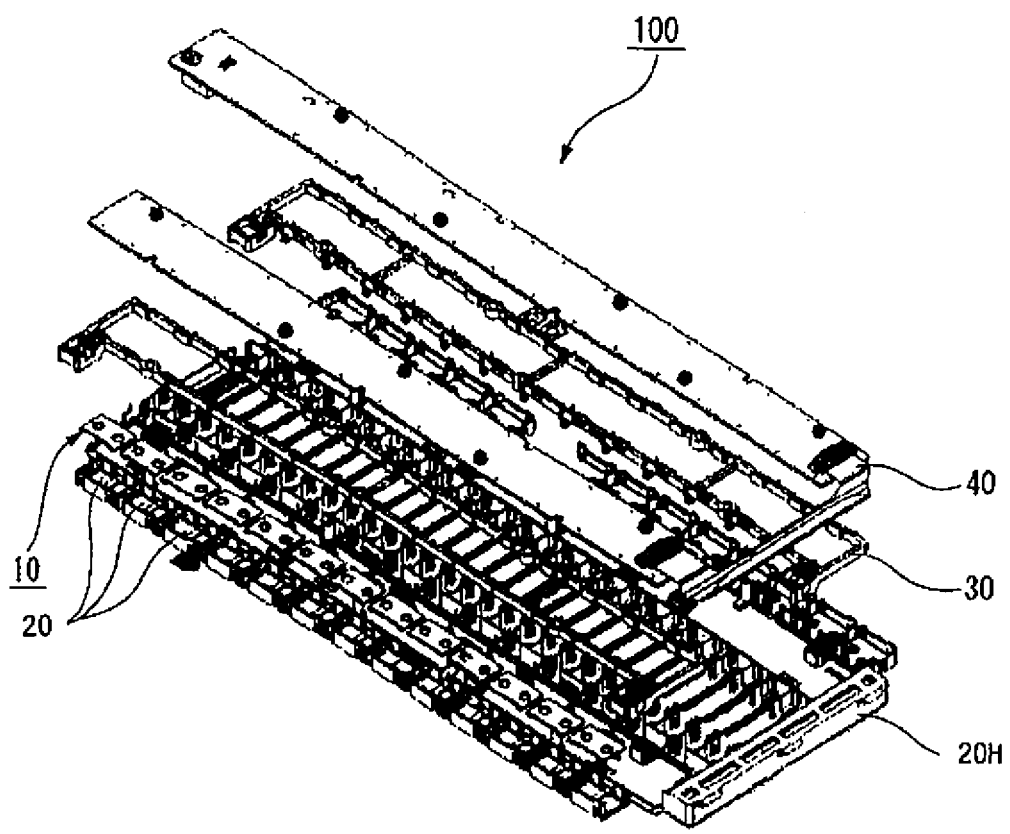
FIG. 10 is an exploded perspective view showing a battery circuit apparatus of FIG. 9.
Figure 11B:
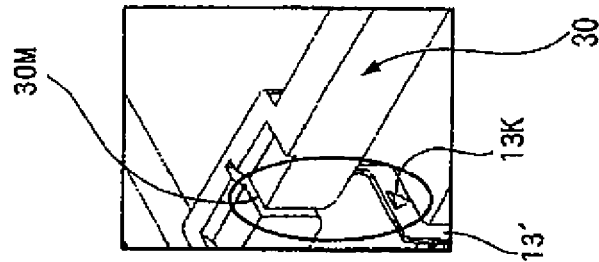
FIGS. 11A and 11B are diagrams describing the periphery of a resin case described in Patent Literature 2.
Figure 11A:
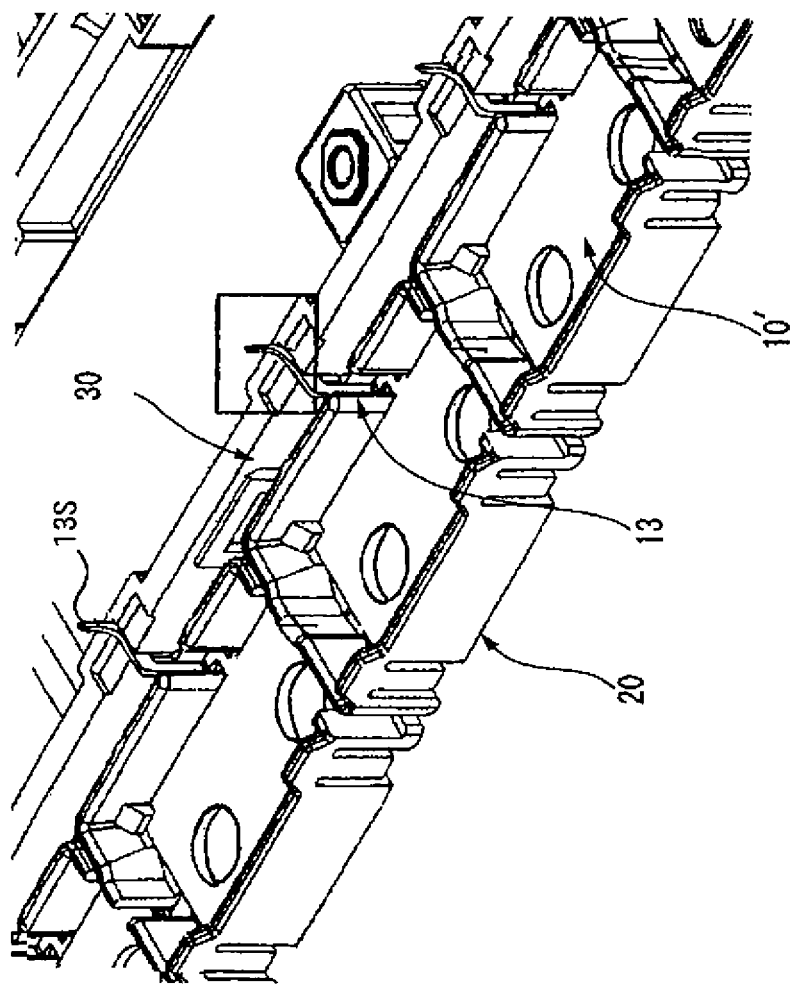
Figure 12:
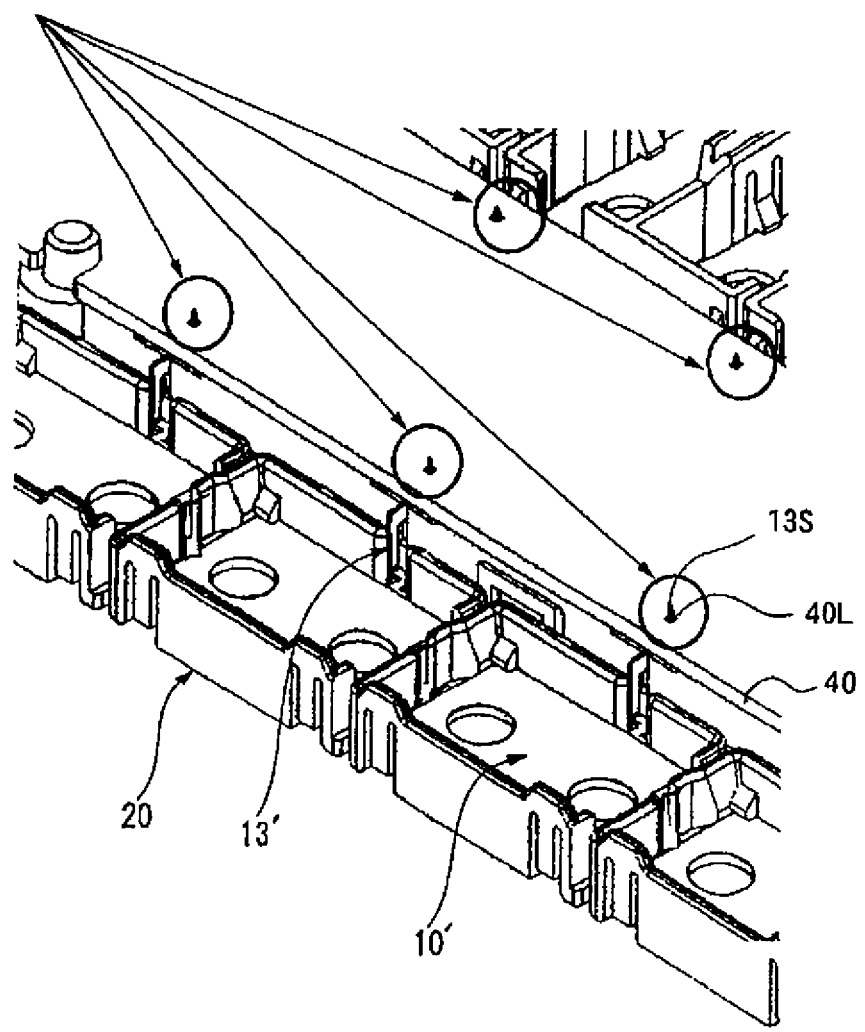
FIG. 12 is a perspective view describing a soldering region of a printed board and the terminal for voltage detection described in Patent Literature 2.
Figure 13:
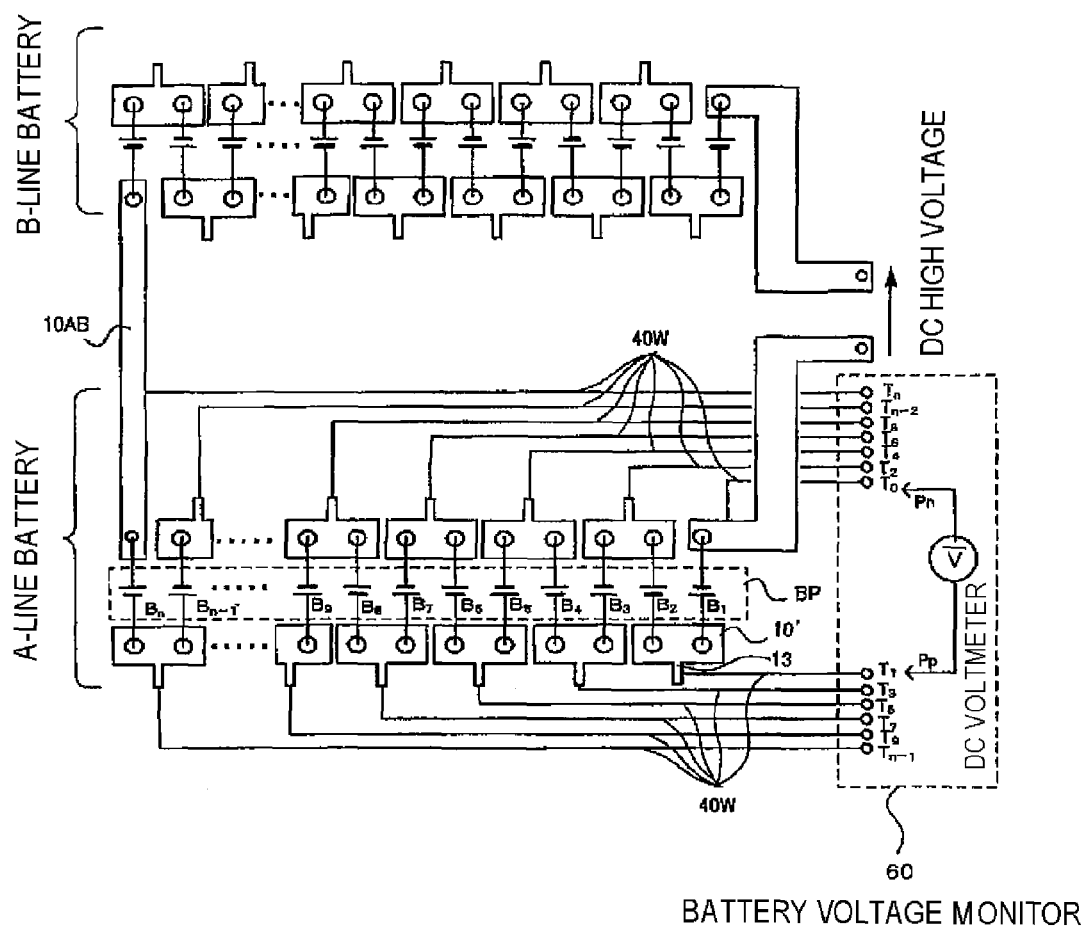
FIG. 13 is a circuit diagram of a battery circuit apparatus common to the invention and Patent Literature 2 made by using the terminals for voltage detection formed integrally to the busbars.

Each of the busbars 10 sheared from a chained state is accommodated in each of the resin cases 20 in a state of FIG. 1B. Therefore, the terminal 13 for voltage detection integral with the busbar 10 is also accommodated inside a groove 30M of a resin frame 30 in an erect state. The top 13S of the terminal 13 for voltage detection projects highly from the resin frame 30 in a state of accommodating the terminal 13 for voltage detection inside the groove 30M of the resin frame 30. The projection height becomes higher than a thickness of the printed board 40 (FIG. 10) placed on the terminals 13, and the top 13S of the terminal 13 for voltage detection is projected from the through hole of the printed board 40 in a state of placing the printed board 40 and can be soldered to a conductor of the printed board 40.

(2) <<Press-In of Resin Frame 30>>

FIG. 2B is a perspective view separately depicting the resin frame 30 and the terminal 13 for voltage detection of the inside of the frame surrounded by the quadrilateral of FIG. 2A. The resin frame 30 descends from an upper portion of the terminal 13 for voltage detection, and the vicinity of the top of the terminal 13 for voltage detection is pressed into the groove 30M of the resin frame 30.

The locking protrusion 13K inclined so as to increase the thickness upward by the embossed protrusion is formed on the lateral surface of the terminal 13 for voltage detection, and the terminal 13 for voltage detection accommodated inside the groove 30M of the resin frame 30 is prevented from coming out.

(3) <<Soldering to Printed Board 40>>

Figure 3:
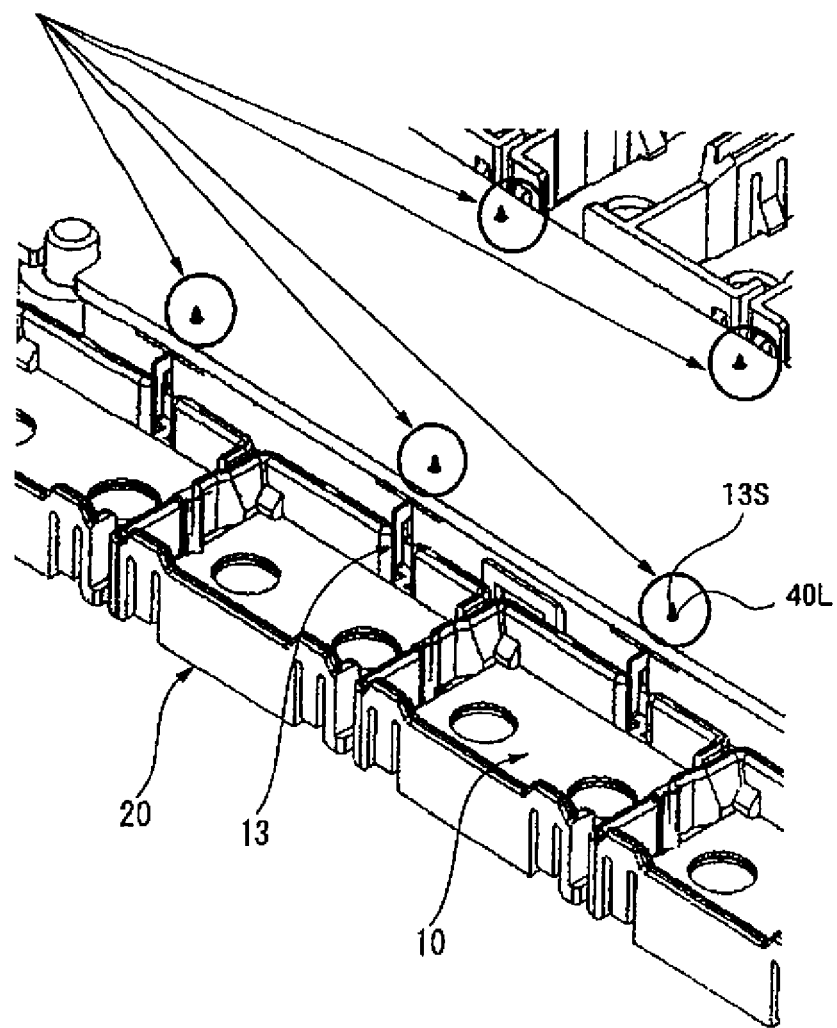
FIG. 3 is a perspective view describing a soldering region of a printed board and the terminal for voltage detection according to the invention.
Figure 7:
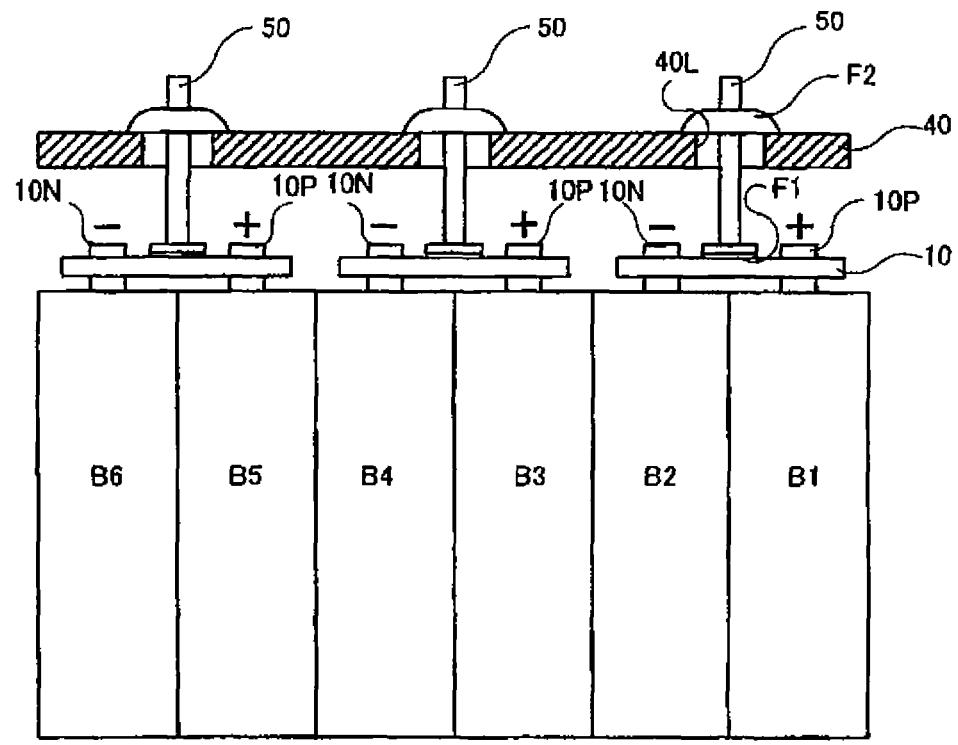
FIG. 7 is a front view describing a state of connection between a terminal for voltage detection and battery electrode posts of a voltage monitor described in Patent Literature 1.

FIG. 3 is a perspective view describing a soldering region of the printed board 40 and the terminal for voltage detection according to the invention. Thereafter, the printed board 40 (FIG. 10) is placed on the terminals 13 for voltage detection and in that case, the top 13S of each of the terminals 13 for voltage detection is inserted into each of the through holes 40L provided in the printed board 40 (basically the same as FIG. 7) and is connected to a wiring pattern provided on this printed board 40 by soldering as shown in FIG. 3 and assembly is completed.

<Function of Busbar 10 of the Invention>

Figure 4A:
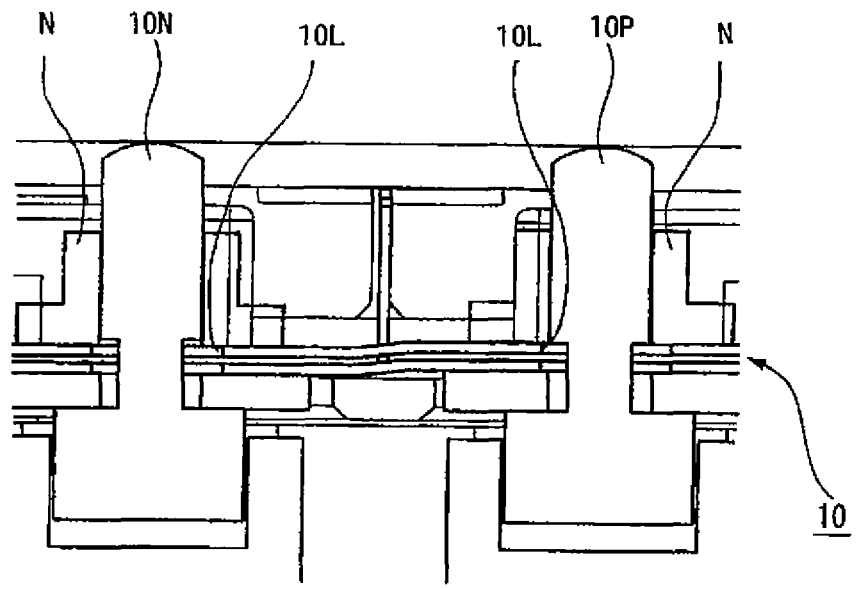
FIGS. 4A and 4B are longitudinal sectional views longitudinally taken on a surface including two adjacent electrode posts in each of a busbar A of the invention and a busbar B of Patent Literature 2.

FIG. 4A is a diagram describing a merit of the busbar 10 of the invention, and even when two electrode posts vary in height in the case of inserting a positive electrode post 10P of a battery and a negative electrode post 10N of an adjacent battery into each of the holes 10L, 10L (FIG. 1B) of the busbar 10 (FIG. 1A) according to the invention and respectively tightening the electrode posts with nuts N, flexibility can be obtained by a folded structure since the busbar 10 is constructed of the two thin busbars 11, 12, so that even when the busbar 10 is inclined and attached, the busbar 10 flexes halfway and contact among the positive electrode post 10P, the busbar 10 and the nut N and among the negative electrode post 10N, the busbar 10 and the nut N is respectively made horizontally, with the result that a contact area becomes large and a load is not applied to the battery.

According to the busbar 10 of the invention thus, the load is prevented from being applied to the battery by good contact among both of the electrode posts, the busbar and the nut without inclining a contact portion of the busbar even when the two electrode posts vary in height.

Figure 4B:
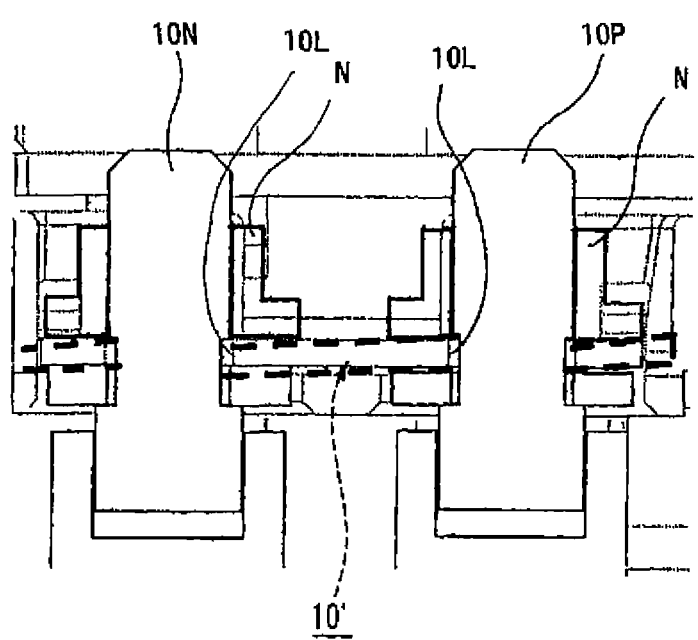
Figure 5:
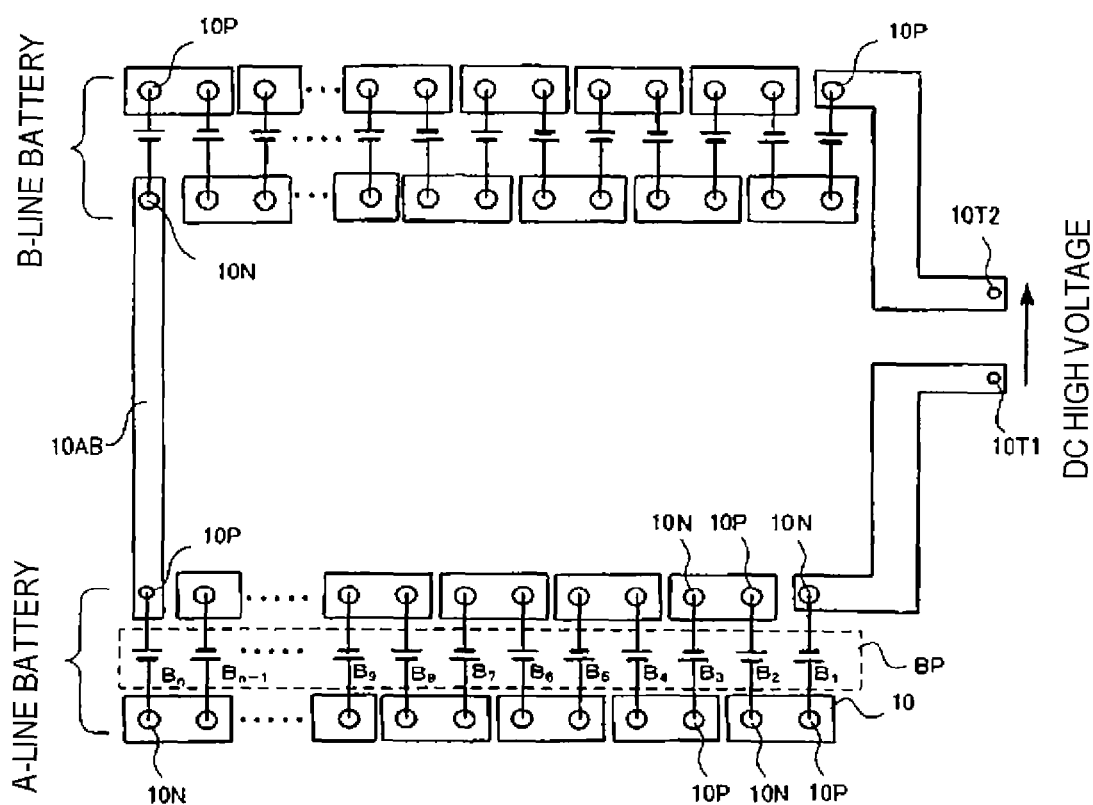
FIG. 5 is a connection diagram of a main circuit of batteries which a battery voltage monitor according to the invention targets for monitoring.
Figure 6:
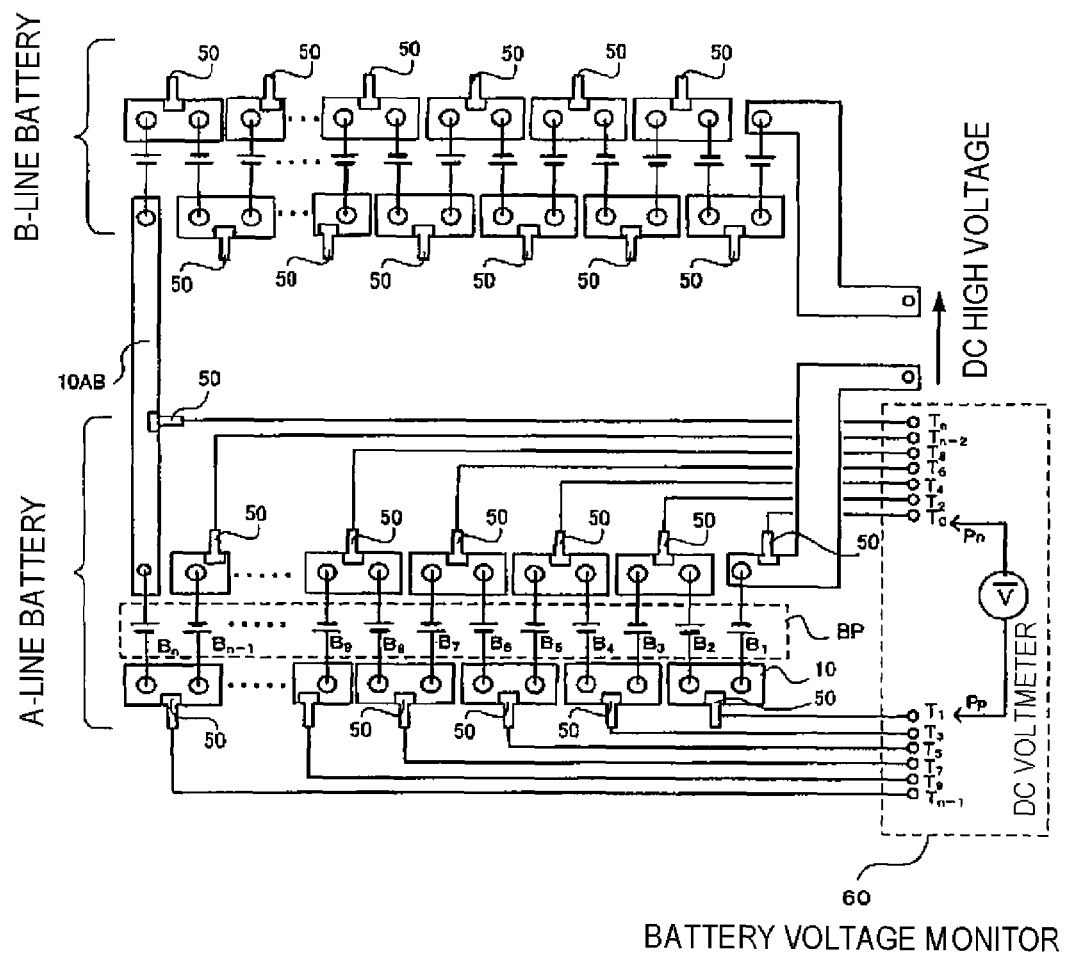
FIG. 6 is a circuit diagram of a battery circuit apparatus described in Patent Literature 1 made by using a terminal for voltage detection in which welding etc. are performed to a busbar.

On the other hand, in the busbar 10' described in Patent Literature 2, when two electrode posts vary in height in the case of inserting a positive electrode post 10P of the battery and a negative electrode post 10N of the adjacent battery into each of the holes 10L, 10L of the busbar 10' and respectively tightening the electrode posts with nuts N as shown in FIG. 4B, the busbar 10' has rigidity, so that the busbar 10' is inclined and attached and poor contact among both the electrode posts, the busbar 10' and the nuts N occurs.

<Advantage of Busbar 10 of the Invention>

(1) Since the conventional terminal 50 for voltage detection was separate from the busbar 10, the process of welding, solder, pressure welding, etc. for connecting both of the terminal 50 and the busbar 10 was required, but as described above, the terminal 13 for voltage detection of the invention is punched integrally to the busbar 10 by press herein, so that the terminal 13 for voltage detection is formed by only vertically erecting the terminal 13 (FIG. 1C) for voltage detection from the busbar 10, with the result that the connection process of welding, solder, pressure welding, etc. can be omitted and the number of components can be reduced.

(2) Moreover, even when the electrode posts of the battery and the adjacent battery vary in height, the busbar 10 is constructed of the two thin busbars 11, 12 and has flexibility, so that even when the busbar 10 is inclined and attached, the busbar 10 flexes halfway and contact among the positive electrode post 10P, the busbar 10 and the nut N and among the negative electrode post 10N, the busbar 10 and the nut N is respectively made horizontally, and the contact area becomes large and the load is not applied to the battery.

The present application is based on Japanese patent application No. 2009-247997 filed on Oct. 28, 2009, and the contents of the patent application are hereby incorporated by way of reference.

REFERENCE SIGNS LIST

10 BUSBAR OF THE INVENTION
10H HINGE PART
10K ELONGATED OPENING
10L HOLE
10N NEGATIVE ELECTRODE POST OF BATTERY
10P POSITIVE ELECTRODE POST OF BATTERY
11 ONE BUSBAR (THIN PLATE)
12 THE OTHER BUSBAR (THIN PLATE)
13 TERMINAL FOR VOLTAGE DETECTION
13K LOCKING PROTRUSION
13S TOP OF TERMINAL FOR VOLTAGE DETECTION
20 RESIN CASE
20H SYNTHETIC RESIN-MADE BOARD PART
30 RESIN FRAME
30M GROOVE
40 PRINTED BOARD
40L THROUGH HOLE
N NUT

The invention claimed is:

1. A busbar for battery electrode post connection with a terminal for voltage detection, wherein:
   both ends of a length direction of a rectangular thin plate of a conductive metal are left to connect a first busbar and a second busbar and an elongated opening is formed in a center of the first busbar and the second busbar;
   two holes through which an electrode post of one battery and an electrode post of an adjacent battery are inserted are respectively formed in the rectangular thin plates of both the first busbar and the second busbar around the elongated opening of the center;
   a terminal for voltage detection is extended integrally to the rectangular thin plate from an edge of the rectangular thin plate;
   the two holes of the first busbar and the two holes of the second busbar overlap in a state where the rectangular thin plate is folded in two with respect to the elongated opening; and
   the terminal for voltage detection is integrally formed with the rectangular thin plate and is erected by folding the terminal for voltage detection in a direction perpendicular to the rectangular thin plate.

2. The busbar for battery electrode post connection with a terminal for voltage detection as claimed in claim 1, wherein a locking protrusion by an embossed protrusion is formed on a lateral surface of the terminal for voltage detection.

3. The busbar for battery electrode post connection with a terminal for voltage detection as claimed in claim 1, wherein a height of a top of the terminal for voltage detection is a height in which the terminal for voltage detection can project over a printed board in a state of being inserted into a through hole of the printed board.

4. A DC high-voltage power source circuit and battery voltage monitor, wherein:
   a DC high-voltage power source circuit is made by juxtaposing plural batteries with electrode posts of mutually different polarities arranged adjacently and connecting the electrode posts of the different polarities of the adjacent batteries by a busbar;
   a battery voltage monitoring circuit is formed so as to detect a voltage between the busbar and an adjacent busbar through a printed board; and
   a busbar for battery electrode post connection with a terminal for voltage detection as claimed in claim 1 is used in connection between the busbar and the printed board.

5. The busbar for battery electrode post connection with a terminal for voltage detection as claimed in claim 1, wherein the terminal is erected during a formation of the busbar.

* * * * *